July 27, 1954
E. F. STENEMAN
2,684,876
LUMBER SLEEVE
Filed Sept. 25, 1950
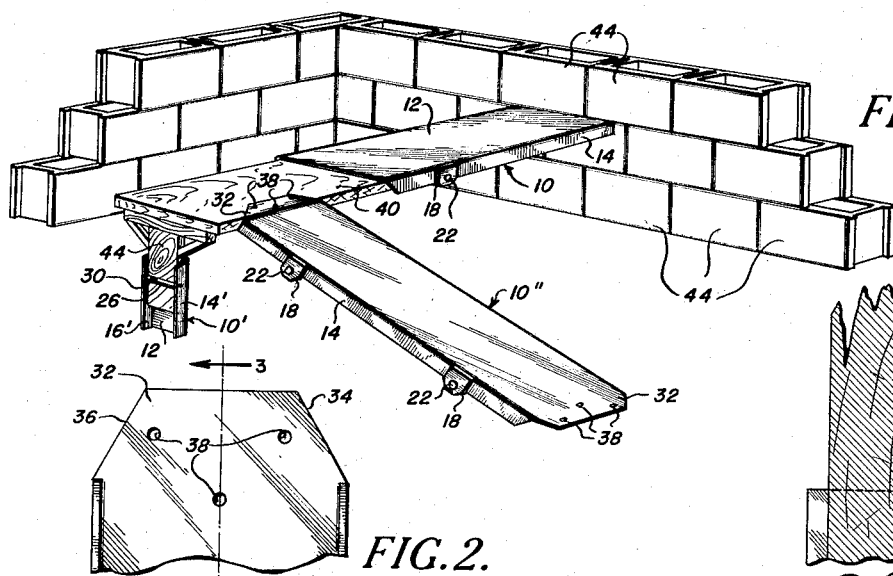
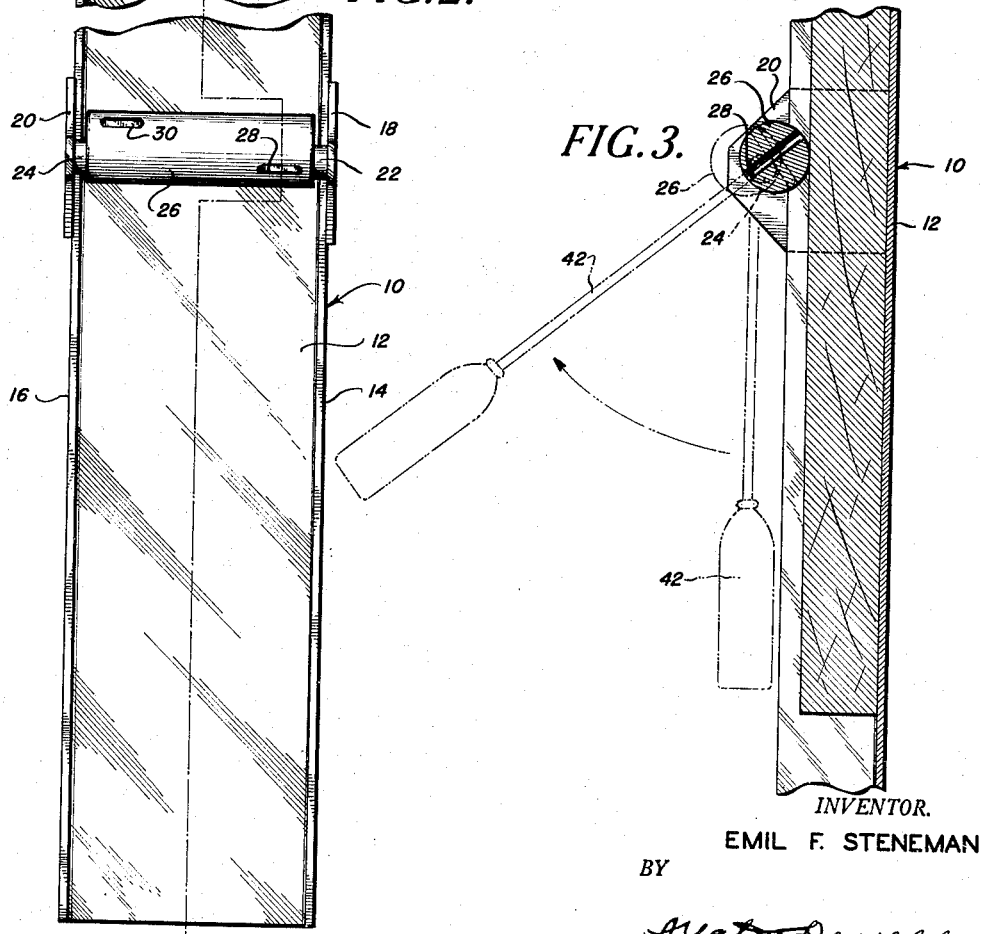
INVENTOR.
EMIL F. STENEMAN
BY
*A. Yates Dowell*
ATTORNEY Patented July 27, 1954

2,684,876

UNITED STATES PATENT OFFICE 2,684,876

LUMBER SLEEVE

Emil F. Steneman, Roberts, Wis.

Application September 25, 1950, Serial No. 186,619

1 Claim. (Cl. 304—39)

This invention relates to construction work and more particularly to an adjustable lumber sleeve which may be used in conjunction with lumber for forming scaffolds, braces, ramps and other temporary structures used during the construction of buildings, dams, bridges and the like.

One object of the present invention is to provide a lumber sleeve of general utility which can be clamped or otherwise secured to pieces of lumber to form various temporary structures used during construction work.

Another object of the present invention is to provide a lumber sleeve which can be clamped to the end of a piece of lumber to form an extension thereof and which may be readily adjusted to vary the overall length.

Another object of the present invention is to provide an adjustable lumber sleeve which may be readily clamped to the adjacent ends of separate pieces of lumber and adjusted to vary the overall length between the extremities.

A still further object of the present invention is the provision of a lumber sleeve which, among its other functions, is adapted to form a ramp in conjunction with temporary scaffolds and the like.

Further objects and advantages of the invention will be apparent from the following description taken in conjunction with the accompanying drawings, wherein:

Fig. 1 is a perspective view illustrating several uses of a lumber sleeve in conjunction with a temporary scaffold utilized for setting concrete blocks;

Fig. 2, a bottom plan view of one preferred form of the lumber sleeve of the present invention; and Fig. 3, a section taken on the line 3—3 of Fig. 2 and showing the cam roller in both an inoperative and a clamping position.

Referring now to the drawings in detail, a lumber sleeve 10, as shown in Figs. 2 and 3, is generally channel-shaped in cross section.

The flat intermediate portion 12 is of substantially the same width as the lumber with which the sleeve is adapted to be used and, as shown in Fig. 1, the sleeves may be made in different sizes of various lengths and widths to accommodate the standard sizes of lumber in common use. The intermediate portion 12 is provided with opposite side flanges 14 and 16 which are preferably somewhat wider than the thickness of the lumber with which the sleeve is adapted to be used.

Side flanges 14 and 16 each have ears 18 and 20 extending outwardly and provided with suitable openings in which the stub shafts 22 and 24 on opposite ends of the cam roller 26 are journalled. Cam roller 26 is provided with diametrical slots 28 and 30 which extend at right angles to each other for a purpose to be described subsequently. As shown in Fig. 3, cam roller 26 is mounted eccentrically with respect to the stub shafts 22 and 24.

The intermediate portion 12 is extended beyond the side flanges 14 and 16 to provide a projection 32 which is preferably provided with beveled corners 34, 36 and a plurality of suitable openings 38.

In one preferred use of the device a piece of lumber 40 is slid between the intermediate portion 12 and the cam roller 26, and a suitable tool, such as a screwdriver 42 as shown in phantom lines in Fig. 3, is inserted in one of the openings 28 or 30 and the cam roller 26 is rotated from the inoperative position shown in phantom lines into clamping engagement with a piece of lumber 40. Other means may obviously be used for rotating the cam roller, such as a crank handle on the end of one of the stub shafts 22 and 24.

As shown in Fig. 1, the projection 32 may be conveniently inserted between the concrete blocks 44 to support one end of the plank, and the other end of the plank may be supported by a smaller lumber sleeve 10' of similar construction attached to a vertical support 44 which can be adjusted to maintain the plank 40 in a level position. The lumber sleeve 10' has side flanges 14' and 16' which are considerably wider than the thickness of the lumber and the cam roller 26 is eccentrically mounted in openings formed in the side flanges 14' and 16'. Another lumber sleeve 10'' may have the projection 32 resting on one edge of the plank 40 and secured thereto by suitable fastening means to form a ramp with the opposite end resting on the ground.

Where an adjustable brace is required, a lumber sleeve such as 10'' provided with projections 32 at both ends and with cam rollers such as those shown at 26 mounted adjacent each end may be utilized. Adjacent ends of two pieces of lumber can be inserted in opposite ends of the sleeve and the two pieces spread sufficiently to form a rigid brace wherever required. The cam rollers 26 may then be rotated into clamping engagement with the two pieces of lumber and, if desired, additional securing means may be inserted through the openings 38.

The device of the present invention is obviously of general utility in numerous applications which will be readily apparent to persons doing construction work of all kinds, and various other uses than those disclosed will be readily apparent. Only a few typical applications have been illustrated utilizing one preferred embodiment of the invention.

It will be obvious to those skilled in the art that various changes may be made in the invention without departing from the spirit and scope thereof and, therefore, the invention is not limited by that which is shown in the drawings and described in the specification, but only as indicated in the appended claim.

What is claimed is:

A lumber sleeve comprising an elongated channel-shaped member having an intermediate portion and opposite side flanges, said intermediate portion projecting beyond said side flanges at one end thereof to provide a projection adapted to be supported between courses of building blocks, a cam roller mounted in said flanges between the ends of said sleeve and spaced from said intermediate portion and having a substantial portion of said sleeve projecting beyond said cam in both directions, said cam roller being formed with engaging portions for selective engagement by a tool for positively rotating said cam for producing a wedging action on a plank which may be positioned in said channel between said cam and said intermediate portion thereby providing an extensible scaffold member.

References Cited in the file of this patent

UNITED STATES PATENTS

| Number | Name | Date |
| --- | --- | --- |
| 1,291,519 | Hodges | Jan. 14, 1919 |
| 1,344,139 | McMillan | June 22, 1920 |
| 1,674,105 | Gascard | June 19, 1928 |
| 1,718,891 | Bratt | June 25, 1929 |
| 2,172,796 | Krasin | Sept. 12, 1939 |

FOREIGN PATENTS

| Number | Country | Date |
| --- | --- | --- |
| 406,645 | Great Britain | of 1934 |